(No Model.)
G. A. BACHMANN.
JAW TRAP.
No. 426,579. Patented Apr. 29, 1890.
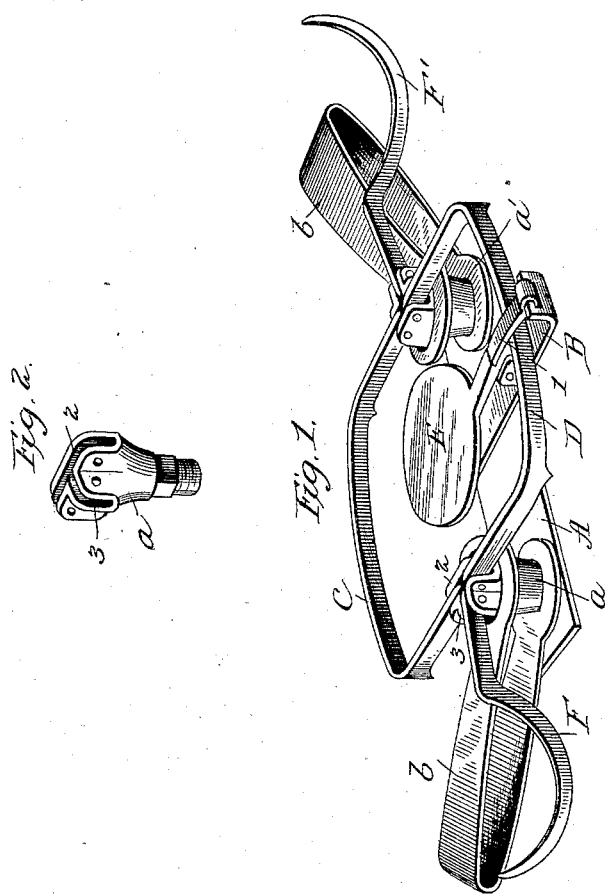
Attest
Walter Donaldson
J. P. Witt.
Inventor
Gustave A. Bachmann
by J. B. Chamberlain
Atty

UNITED STATES PATENT OFFICE.

GUSTAVE ADOLF BACHMANN, OF DEL NORTE, COLORADO.

JAW TRAP.

SPECIFICATION forming part of Letters Patent No. 426,579, dated April 29, 1890.

Application filed August 12, 1889. Serial No. 320,526. (No model.)

*To all whom it may concern:*

Be it known that I, GUSTAVE ADOLF BACHMANN, a citizen of the United States, residing at Del Norte, in the county of Rio Grande and the State of Colorado, have invented new and useful Improvements in Jaw Traps, as set forth in the following specification.

My invention relates to various new and useful improvements in spring-actuated jaw traps; and its object is to produce a more efficient trap than those now in general use, which I accomplish by the following arrangement of parts, as shown in the accompanying drawings, which are made a part of this specification, in which like letters and figures refer to identical parts.

Figure 1 of the drawings shows the trap in perspective as it appears when set, and Fig. 2 represents one of the two jaw and gripper supports in detail.

The base A B, Fig. 1, the springs $b$ $b$, the jaws C and D, the trip and latch E and 1, respectively, are the same as or similar to those in general use in this class of traps, and are readily understood by reference to the drawings. Such traps often fail to catch or to retain the game sought, and to overcome this deficiency I supplement the jaws C and D with sharp catch-hooks F F', actuated simultaneously with the jaws and by the same springs.

To apply my improvement to such traps as are now manufactured, it is only necessary to substitute the jaw and hook-posts $a$ $a'$ (shown in detail in Fig. 2) for those ordinarily in use and attach the gripping-hooks with a pivot in the post-ears 3, adapted to receive them. The hooks should be pivoted on a screw in order that they may be readily removed if it is desirable to use the trap without them.

Among the advantages of my invention are the following: Animals cannot twist or gnaw off their legs and escape. If an animal springs the trap otherwise than with a foot, it is nevertheless likely to be caught. When an animal is caught, its death will be speedily caused by the penetration of the hooks.

Having explained my invention, I desire to secure by Letters Patent the following claim:

The combination, with the jaws D C and the hooks F F', one at each end of said jaws and operating at right angles thereto, of the posts $a$ $a'$, having ears 2 and 3 to receive said jaws and hooks, substantially as set forth.

GUSTAVE ADOLF BACHMANN.

Witnesses:
H. W. BACHMANN,
T. V. WILSON.